United States Patent Office 3,341,286
Patented Sept. 12, 1967

3,341,286
METHOD OF REMOVING SODIUM CARBONATE FROM SODIUM ALUMINATE LIQUOR
Henri Mercier and Maurice Jamey, Gardanne, France, assignors to Pechiney, Compagnie de Produits Chemiques et Electrometallurgiques, Paris, France
No Drawing. Filed Nov. 4, 1964, Ser. No. 408,730
Claims priority, application France, Nov. 19, 1963, 954,258
5 Claims. (Cl. 23—143)

This invention relates to the process for the production of alumina from baxuite for use in the production of aluminum, as by the Bayer process, and it relates more particularly to the process for regeneration of the soda lye (sodium hydroxide solution) used in the production of alumina.

In the production of alumina, baxuite is attacked by a hot and concentrated solution of sodium hydroxide to dissolve out aluminum compounds, leaving a red sludge. The red sludge is separated by decantation and filtration and discarded as a gangue while the solution of caustic sodium aluminate is diluted and seeded with alumina with a resultant precipitation of alumina. The alumina is separated as a product and the remaining liquor of dilute lye of caustic sodium aluminate is processed, as by evaporation, to regenerate the liquor to a solution sufficiently concentrated in sodium hydroxide to make up a part of the subsequent charge for use in the treatment of the bauxite.

The sodium aluminate solution also contains an amount of soda (sodium carbonate) in solution which is derived from the carbonates contained in the bauxite. When the solution is diluted to precipitate alumina, the carbonates exist in a completely dissolved state, and the ratio of sodium, in carbonated form, to sodium total in the lye may be approximately within the range of 8 to 20 percent by weight. The solubility of sodium carbonate falls rapidly when the total content of the $Na_2O$ of the liquor increases. For example, in a lye containing 330 grams per liter of total soda, calculated as $Na_2O$, the amount of dissolved sodium carbonate, calculated as $Na_2O$, at the point of saturation is 5.5 percent by weight of the total $Na_2O$ of the liquor. During concentration by evaporation, some of the sodium carbonate thus precipitates. Concentration of the dilute solution, as in a multiple effect evaporator, results commercially in the precipitation of sodium carbonate as very fine crystals having a mean diameter of but a few microns. These fine crystals of sodium carbonate are not easily separated by decantation or by centrifugal separation and they remain dispersed in the concentrated lye solution.

For separation of these fine crystals of sodium carbonate from the solution, it has been necessary to carry out filtration under pressure of a few kg./cm.$^2$ with a filter cloth of synthetic fibers of very fine mesh. Use is made most frequently of a "Kelly" type filter using a filter cloth of polyamide fibers. The filter tank becomes filled with salts after about one hour of continuous operation and it becomes necessary to clean the filters as by solution in reverse flow through the filter system. Return of the filter tank to operation often requires as much as five to six hours and even then cleaning is substantially incomplete.

It is possible to effect an increase in the size of the crystals formed of sodium carbonate by cooling the effluent from the evaporator containing 300–330 grams per liter of $Na_2O$ to a temperature below 60° C. However, this process is costly from the standpoint of heat energy since it thereafter becomes necessary to reheat the large amount of solution for its subsequent use in the treatment of bauxite. There is no advantage in the increase in the amount of concentration by further evaporation to increase the concentration of the lye to an amount greater than 330 grams per liter of $Na_2O$ since such additional vaporization requires higher vapor pressure in order to avoid emulsification. Further, precipitation of the carbonate has been found also to occur in the tubes of the evaporator and require frequent cleaning and such precipitation in the tubes also imposes the danger of clogging.

It is an object of this invention to provide a method for increasing the size of the sodium carbonate crystals formed during concentration of the liquor following separation of the alumina, and it is a related object to provide a new and novel process for the treatment of the liquor remaining after separation of the alumina to produce sodium carbonate crystals of a dimension sufficiently large to enable easy and complete separation during concentration of the liquor to increase the amount of $Na_2O$ to within the normal region of 280–330 grams per liter.

In accordance with the practice of this invention, approximately half of the amount of sodium hydroxide can be recovered by decantation without filtration to leave a thick paste containing the crystals of sodium carbonate which can be separated easily and quickly by simple filtration, using a metal cloth filter which is characterized by greater mechanical strength and chemical resistance by comparison with the synthetic resinous filter cloth heretofore employed. Further, it is much easier to discharge and clean the filter by conventional mechanical means by reason of the greater strength and stability of the metal fiber filter cloth.

In accordance with the practice of this invention, a solution of sodium hydroxide containing 400–600 grams per liter of $Na_2O$ is added to the suspension of fine crystals of sodium carbonate in the concentrated liquor or lye. Addition is preferably made in an amount to raise the concentration in the solution to about 350 grams of total $Na_2O$ per liter. In the preferred practice, the solution to which the concentrated sodium hydroxide has been added is heated to an elevated temperature, such as in the region of about 100° C. Under these conditions, the sodium carbonate crystals grow rapidly from a few microns to a diameter such as 300–500 microns, whereby separation of the larger crystals can be effected readily by decantation to leave a clean supernatent solution.

The addition of a concentrated solution of sodium hydroxide does not represent an added cost or material since the amount of fresh caustic soda that is added is the amount that is usually required to make up that which is lost by entrainment with the sludge. The amount of dilute liquor to be concentrated and the amount of concentration to be effected can be easily calculated for combination with the sodium hydroxide solution to compensate for the losses of soda in the cycle to increase the content of $Na_2O$ for effecting the desired growth characteristics of the sodium carbonate crystals for easy separation.

The following example is given by way of illustration, but not by way of limitation, of the practice of this invention in a continuous operation for the manufacture of alumina from bauxite by the Bayer process:

In the alkali aluminate liquor separated from the alumina, 9 percent of the total $Na_2O$ was in the carbonate form in the dissolved state. The liquor is processed through a multiple effect evaporator to remove an amount of water corresponding to the various additions of water made during the cycle. The effluent from the evaporators is a liquor having a temperature of approximately 65° C. and a content of 330 grams per liter of total $Na_2O$ of which 300 grams are in the form of caustic $Na_2O$. The lye will also contain about 150 grams per liter of $Al_2O_3$.

Since 9 percent of the total $Na_2O$ is in the form of carbonate and since the solubility of the carbonate under the conditions of temperature and concentration corresponds to 5.5 percent, some of the carbonate will exist in the form of very fine crystals. 15 percent by volume of caustic soda solution containing 560 grams per liter of $Na_2O$ is added. This amount compensates for the soda eliminated with the red sludges and it adjusts the lye to 133 grams per liter of $Al_2O_3$ and 360 grams per liter of total $Na_2O$, of which 335 grams are in the caustic form and 7.2 percent of the total $Na_2O$ being in the form of the carbonate. The total quantity of sodium carbonate has not changed but the solubility of the carbonate has decreased considerably to less than approximately 3.6 percent.

The liquor which has been modified by the addition of the sodium hydroxide is heated to a temperature of approximately 102° C., as by passage through a heat exchanger. Thereafter it is introduced into a decantation tank at approximately midway between the top and bottom. It is in this apparatus that the increase in the sodium carbonate crystals occurs to enable separation, as by decantation. This phenomenon occurs fairly rapidly so that it is possible to recover by decantation approximately half of the volume of the sodium hydroxide in a clear form. The sludge which is removed from the bottom of the tank by a pump contains between 50 and 80 grams per liter of sodium carbonate ($Na_2CO_3 \cdot H_2O$) in the form of crystals having a diameter within the range of 0.3 to 0.5 mm. This sludge is conveyed by the pump at a pressure of a few hundred grams per cm. into a filter equipment with a fine metal cloth for substantially instantaneous filtration in a conventional manner to separate out the crystals from the remainder which contains the remainder of the sodium hydroxide and can be combined with that which has been decanted off. When the filter is filled with crystals, it can be mechanically discharged and the separated carbonate dissolved in a low content sodium hydroxide solution which may be derived from countercurrent flow from the waters used to wash the red sludges and the alumina filters. In accordance with the conventional practice, the carbonate solution can be converted to caustic or sodium hydroxide by the addition of lime in order to recover the sodium carbonate in the form of caustic lye which can be reintroduced into the cycle.

The described process can be operated about ten times faster than those which have previously been employed and use can be made of much higher capacity filter devices which are easier to operate and maintain by comparison with those that have been used in previous systems.

It will be understood that changes may be made in the details of construction, arrangement and operation without departing from the spirit of the invention, especially as defined in the following claims.

We claim:

1. In the process for the production of alumina by the treatment of bauxite with sodium hydroxide to form sodium aluminate from which alumina is precipitated by dilution and wherein the alumina is separated from the remaining liquor, the improvement which comprises the steps of concentrating the liquor to a range of 280–330 grams total $Na_2O$ per liter, adding to the liquor sodium hydroxide solution in which the sodium hydroxide is present in a concentration corresponding to an amount within the range of 400–600 grams $Na_2O$ per liter, heating the resultant mixture whereby sodium carbonate present in the liquor precipitates as crystals of large dimension that enable easy separation, and separating the crystals of sodium carbonate from the solution.

2. The process as claimed in claim 1 in which the sodium hydroxide solution is added to the concentrated liquor in an amount corresponding to 10 to 20 percent by volume of the liquor.

3. The process as claimed in claim 1 in which the amount of sodium hydroxide added corresponds to the amount lost with the separation of sludges remaining from the treatment of the bauxite with sodium hydroxide solution.

4. The process as claimed in claim 1 in which the sodium hydroxide solution is introduced in an amount to raise the total sodium oxide content of the liquor to approximately 350 grams per liter.

5. The process as claimed in claim 1 in which the concentrated liquor having the solution of sodium hydroxide added thereto is heated to a temperature of about 100° C.

References Cited

UNITED STATES PATENTS

| | | | |
|---|---|---|---|
| 2,981,600 | 4/1961 | Porter | 23—143 |
| 3,061,409 | 10/1962 | Robson et al. | 23—63 |

OSCAR R. VERTIZ, *Primary Examiner.*

G. T. OZAKI, *Assistant Examiner.*